Aug. 19, 1969     F. DURAND     3,461,734
DEVICES FOR DRIVING AN INTERAL GEAR
Filed Jan. 18, 1968
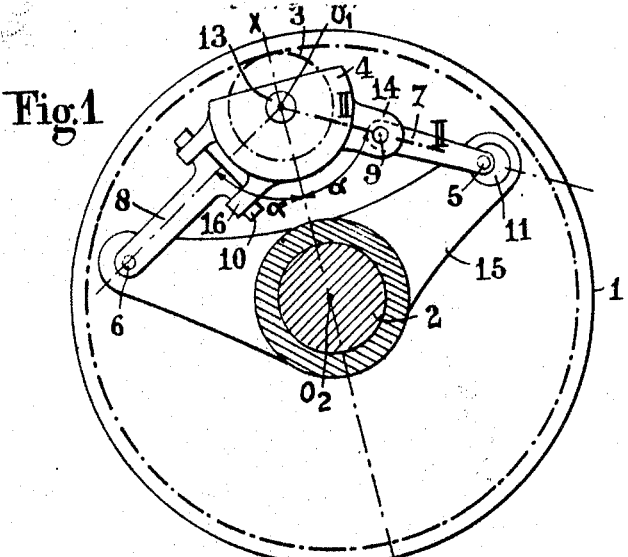
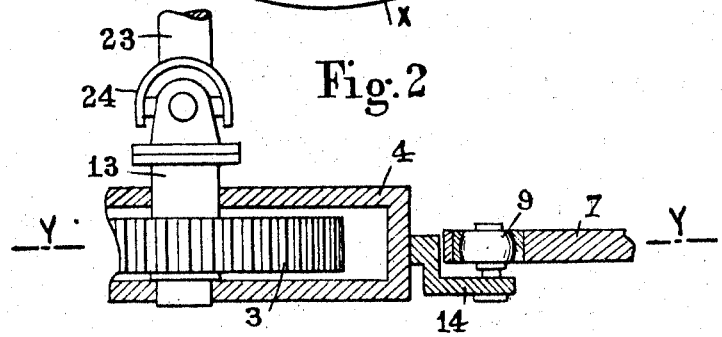
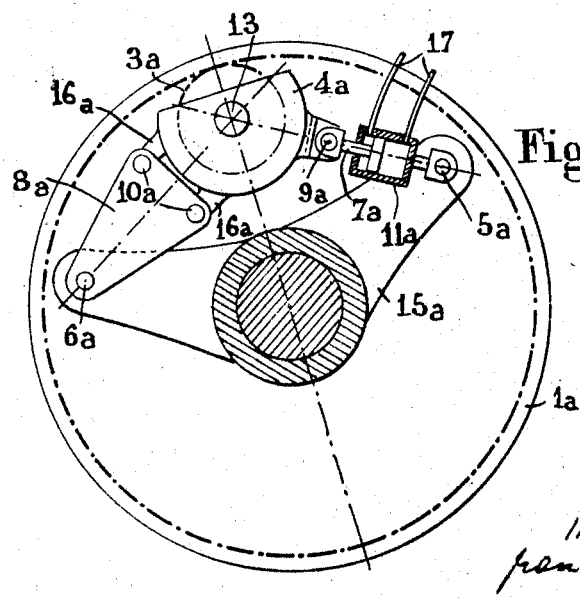
Inventor
François Durand
by Michael J. Striker
Atty

United States Patent Office 3,461,734
Patented Aug. 19, 1969

3,461,734
DEVICES FOR DRIVING AN INTERNAL GEAR
Francois Durand, 108 Blvd. Carnot,
78 Le Vesinet, France
Filed Jan. 18, 1968, Ser. No. 698,757
Claims priority, application France, Jan. 30, 1967,
93,023
Int. Cl. F16h 57/00, 1/06
U.S. Cl. 74—410                                    4 Claims

ABSTRACT OF THE DISCLOSURE

An internal gear driven by a pinion supported on means independent from those of the internal gear. The pinion mounting means has freedom of movement in all directions so that the pinion may assume automatically proper meshing engagement with the internal gear.

---

The present invention relates in general to internal-gear driving devices and has specific reference to a device of this character which is designed for driving an internal gear from a pinion while maintaining a constant and adequate meshing engagement between the driving pinion and the teeth of the internal gear.

To this end the driving pinion is mounted in a support separate from the fixed frame structure supporting the internal gear, and this support has a certain freedom of movement in all directions so that the pinion may assume automatically the proper position in which its teeth engage with their entire surface the teeth of the internal gear, even in case the latter has a defect such as buckling or a machining effect.

The internal-gear driving device according to this invention is characterised in that the pinion support is attached to two fixed points disposed on either side of the plane containing the axis of said pinion and the axis of the internal gear, by means of a pair of anchor rods disposed in the fashion of the arms of a wide-open V, the axes of these rods lying substantially in the median plane of the pinion teeth and forming with the plane containing the axes of said pinion and gear an angle corresponding substantially to the angle complementary to the pressure angle of the teeth, the first rod being pivotally connected by means of universal joints on the one hand to the pinion support and on the other hand to one of the aforesaid fixed points, and the other rod is pivotally connected to the pinion support through the medium of a pivot pin forming an angle therewith, while the opposite end of the same rod is connected by means of a universal point to the other fixed points.

In case the pinion is driven directly from a power shaft the axes of the two anchor rods intersect each other substantially at the centre of this pinion. However, if the pinion is driven via a primary reducing gear incorporated in the pinion support the axes of the two anchor rods intersect each other substantially at the point wherein the pitch circle of the pinion is tangent to the pitch circle of the driven internal gear.

Other features and advantages of the driving device according to the present invention will appear as the following description proceeds with reference to the accompanying drawing illustrating diagrammatically by way of example two typical forms of embodiment of the invention.

In the drawing:

FIGURE 1 is an end elevational view showing an internal gear driven from a device according to this invention;

FIGURE 2 is a fragmentary section taken along the line II—II of FIGURE 1, illustrating a detail of the same device, and FIGURE 3 is a view similar to FIGURE 1 but showing a different form of embodiment of the driving device of this invention.

The transmission device illustrated in FIGURES 1 and 2 is designed for driving a gear 1 having internal teeth concentric to the axis of the gear shaft 2. This device comprises a driving pinion 3 in constant meshing engagement with the teeth of the internal gear 1. This pinion 3 is carried by a shaft 13 rotatably mounted in a support or case 4. This shaft 13 may be coupled directly to a power or motor shaft 23 by means of a coupling 24, for example of the Hooke type, permitting angular movements of the driven shaft in relation to the power or driving shaft.

The shaft 13 may also be driven if desired by means of a primary reduction gear incorporated in the support or case 4 and having in this example its input shaft coupled to a power or driving shaft through coupling means also permitting angular movements or oscillations of the support 4 of said reducing gearing in relation to the driving or power shaft.

It may be emphasized more particularly that the support 4 of the driving pinion 3 is not rigidly secured to the frame structure of the installation or to any fixed supporting means.

In fact, according to the essential feature characterising the device of this invention, this support is connected to only two fixed points, namely 5 and 6, by means of a pair of anchor rods 7 and 8 provided with pivot means at their ends. Thus, anchor rod 7 is pivotally connected to the pinion support 4 by means of a universal joint permitting swivel movements in all directions. This joint may consist for example of a ball-and-socket device comprising a ball 9 engaging a part-spherical socket carried by the corresponding end of the anchor rod 7, the ball 9 being carried by a lug 14 rigid with the pinion support 4.

The opposite end of the same anchor rod 7 is also provided with a ball-and-socket device 5. The ball thereof may be carried by a fixed support 15 rigid with the frame structure of the mechanism which carries on the other hand the other ball 6 pivotally connecting the corresponding end of the other anchor rod 8 to said fixed support.

However, the ball 5 is carried preferably by a member 11 rotatably mounted on the corresponding end of support 15. In this case this ball is disposed in an eccentric position on this member 11 so as to constitute an eccentric device, as shown in FIGURE 1. Under these conditions the support 4 can be held in the position illustrated in FIGURE 1 for either causing the pinion 3 to mesh with the internal gear 1, or moving the pinion away from the teeth of this gear and thus disengage the drive. This is obtained by simply rotating the member 11 of the eccentric device. On the other hand, adequate means may be provided for controlling the rotation of this member 11.

As already explained hereinabove, the other anchor rod 8 is pivotally connected to the fixed support 15 by means of a ball-and-socket joint 6. However, its opposite end is pivoted to the movable support 4 of pinion 3 by means of a cross pin 10 consisting of two trunnions carried by this rod and engaging the corresponding arms of a strap 16 carried by the pinion support 4.

In this respect it may be noted that the pivot pin 10 thus obtained forms an angle in relation to the axis of the anchor rod 8. This angle may be 90 degrees as illustrated in this example, but other values may be chosen therefor, if desired.

It may also be emphasized that the two fixed points 5 and 6 to which the movable support 4 of pinion 1 is connected are disposed on either side of the plane X—X containing the theoretical axis $O_1$ of pinion 3 and the theoretical axis $O_2$ of the driven internal gear.

On the other hand, the two axes of the pair of anchor rods 7 and 8 form with this plane X—X angles α of a value corresponding substantially to the angle complementary to the pressure angle of the teeth.

If the shaft of the driving pinion 3 is coupled directly to the power or motor shaft, as in the example illustrated, the axes of the two anchor rods 7 and 8 intersect each other substantially at the theoretical axis $O_1$ of the pinion. However, if this pinion is driven through the medium of a reducing gearing incorporated in the support or case 4, the axes of the two anchor rods will intersect each other substantially at the point where the pitch circle of the pinion is tangent to the pitch circle of the driven gear.

Finally, it may also be pointed out that the two anchor rods 7 and 8 are disposed substantially in the median plane y—y of the teeth of pinion 3, which is perpendicular to the axis 13 of this pinion (see FIGURE 2).

Under these conditions, the pinion support 4 can swivel freely to an extent sufficient to enable the pinion to assume the proper meshsing position, i.e. the position in which its teeth engage with their entire surface the teeth of the internal gear, even if this gear is defective, for example due to buckling or to a faulty angular position of some teeth.

In fact, in this case the reactions produced during the drive will tend to restore the pinion teeth to a position parallel to the teeth of the driven gear. Now in conventional driving systems this automatic correction cannot be performed under any circumstances.

On the other hand, in the device according to this invention the pinion teeth can set themselves freely in the space to engage with their entire surface the teeth of the internal gear. In fact, the pinion support or case 4 has a sufficient freedom of movement in all direction due to the fact that it is not rigidly secured to a fixed frame structure but simply connected to a pair of fixed points by means of two anchor rods provided with universal joints at their end, except however for one of these joints consisting of a transverse pin 10. In fact, the purpose of this transverse pin 10 is to prevent the pinion support 4 from pivoting about the pinion axis.

Due to its specific arrangement the driving device according to this invention ensures a constant and satisfactory meshing engagement between the driving pinion and the gear teeth, even if the gear is defective.

However, the device of this invention is also advantagous in that the driving pinion may also be easily disengaged from the driven gear by means of the eccentric device comprising the rotary member 11 carrying the ball 5 on which one of the anchor rods is pivoted.

FIGURE 3 illustrates another exemplary form of embodiment of the device of this invention, which is based on the same general principle but differs from the first form of embodiment shown in FIGURES 1 and 2 by various details.

Thus, in this modified form of embodiment the anchor rod 8 of the preceding form of embodiment is replaced by a substantially isosceles triangular plate 8a connecting the movable support 4a of pinion 3a to one of the fixed points 6a.

The acute vertex of this plate 8a is pivoted to the fixed support 15a by means of a ball-and-socket joint disposed at the fixed point 6a. However, the base of this triangular plate 8a is pivoted on the movable support 4a of pinion 3a by means of a pair of ball-and-socket joints 10a carried by lugs 16a rigid with said support. Thus, these ball-and-socket joints 10a replace somewhat the cross pins 10 provided in the preceding form of embodiment. In fact, due to the provision of two ball-and-socket joints, instead of a single one, the movable support 4a of pinion 3a is prevented from rotating about the pinion axis.

On the other hand, the eccentric system provided at one end of the other anchor rod is dispensed with. However, the corresponding anchor rod 7a is connected to the relevant fixed point 5a by means of a hydraulic cylinder-and-piston unit or actuator 11a.

This actuator 11a is connected by pipe lines 17 to a hydraulic control circuit for contracting or expanding the actuator, at will.

As will be readily understood from FIGURE 3, when the actuator 11a is contracted the movable support 4a of driving pinion 3a is moved away from the gear teeth and thus the drive is disengaged. On the other hand, in the other case the pinion is kept in meshing engagement with the teeth of the gear to be driven.

However, this hydraulic actuator 11a may also be dispensed with. In fact, the anchor rod 7a may be replaced by a two-section telescopic rod, suitable means being provided for controlling the contraction and expansion of this rod, according as it is desired to engage or disengage the drive between the pinion and gear.

What I claim is:

1. Device for driving an internally-toothed gear, comprising in combination at least one pinion driving said gear; a movable support for said pinion, said support being connected to two fixed points disposed on either side of the plane containing the pinion axis and the gear axis; two anchor elements for this connection, these elements forming together the wide-open arms of a V and having their axes disposed substantially in the median plane of the pinion teeth, forming with the plane containing the pinion and gear axes an angle corresponding substantially to the angle complementary to the pressure angle of the teeth, the first anchor element being connected through universal joints on the one hand to the pinion support and on the other hand to one of the aforesaid fixed points, the other anchor element being pivoted to the pinion support by means of a pivot pin forming an angle to said anchor element, the opposite end of this other anchor element being pivoted by means of a universal joint to the other fixed point.

2. Driving device according to claim 1, in which the other anchor element consists of an isosceles triangular plate having its vertex pivotally connected by means of a ball-and-socket joint to the relevant fixed point and its base pivotally connected to the pinion support by means of a pair of ball-and-socket joints spaced from each other.

3. Driving device according to claim 1, in which one of said anchor elements is attached to one of its pivot points by means of a hydraulic cylinder-and-piston unit adapted to be retracted for controlling the movement of the pinion support away from the teeth of the driven internal gear, for discontinuing the meshing engagement between the pinion and gear.

4. Driving device according to claim 1, in which one of said anchor elements is pivotally connected to one of its pivot points by means of an eccentric device consisting of a member adapted to rotate about its axis and carrying at an eccentric position the corresponding universal joint of the anchor element, whereby the movement of the pinion support away from the gear teeth and therefore the disengagement of the drive between the pinion and gear can be obtained by simply rotating said member about its axis.

References Cited

UNITED STATES PATENTS

| 1,148,478 | 7/1915 | Jepson | 74—410 X |
| 2,462,455 | 2/1949 | Bartlett | 74—413 |
| 2,895,342 | 7/1959 | Hayhurst | 74—409 |
| 3,036,475 | 5/1962 | Haupt | 74—410 |

LEONARD H. GERIN, Primary Examiner

U.S. Cl. X.R.

74—405, 409, 413